Figure 1:
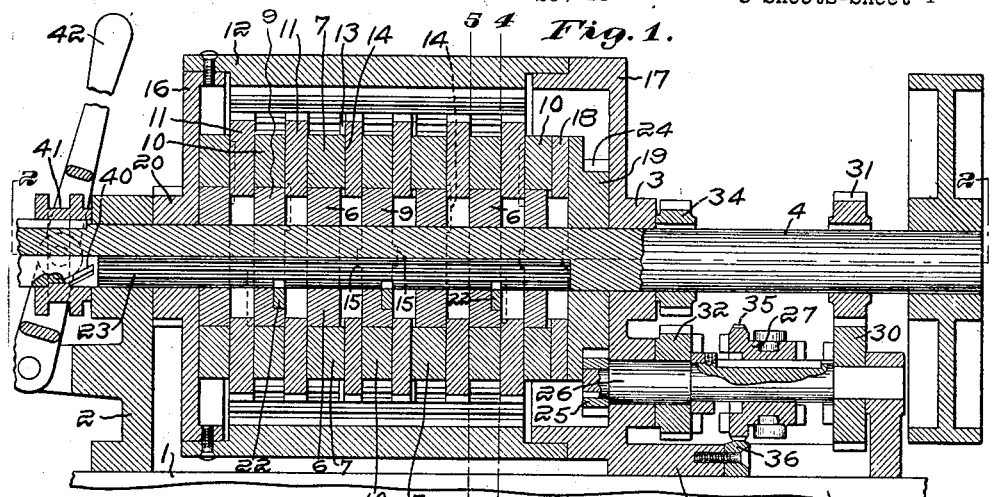

Oct. 9, 1923.

B. HALL 1,470,559

SPEED VARYING MECHANISM

Filed Jan. 20, 1914

6 Sheets-Sheet 1

Witnesses:
Carl L. Choate.
Horace A. Crossman

Inventor:
Bicknell Hall,
by Emery, Booth, Janney & Varney
Attys.

Oct. 9, 1923.

B. HALL 1,470,559

SPEED VARYING MECHANISM

Filed Jan. 20, 1914

6 Sheets-Sheet 2

Witnesses:
Carl L. Choate.
Horace A. Crossman

Inventor:
Bicknell Hall,
by Emery, Booth, Janney & Varney
Attys.

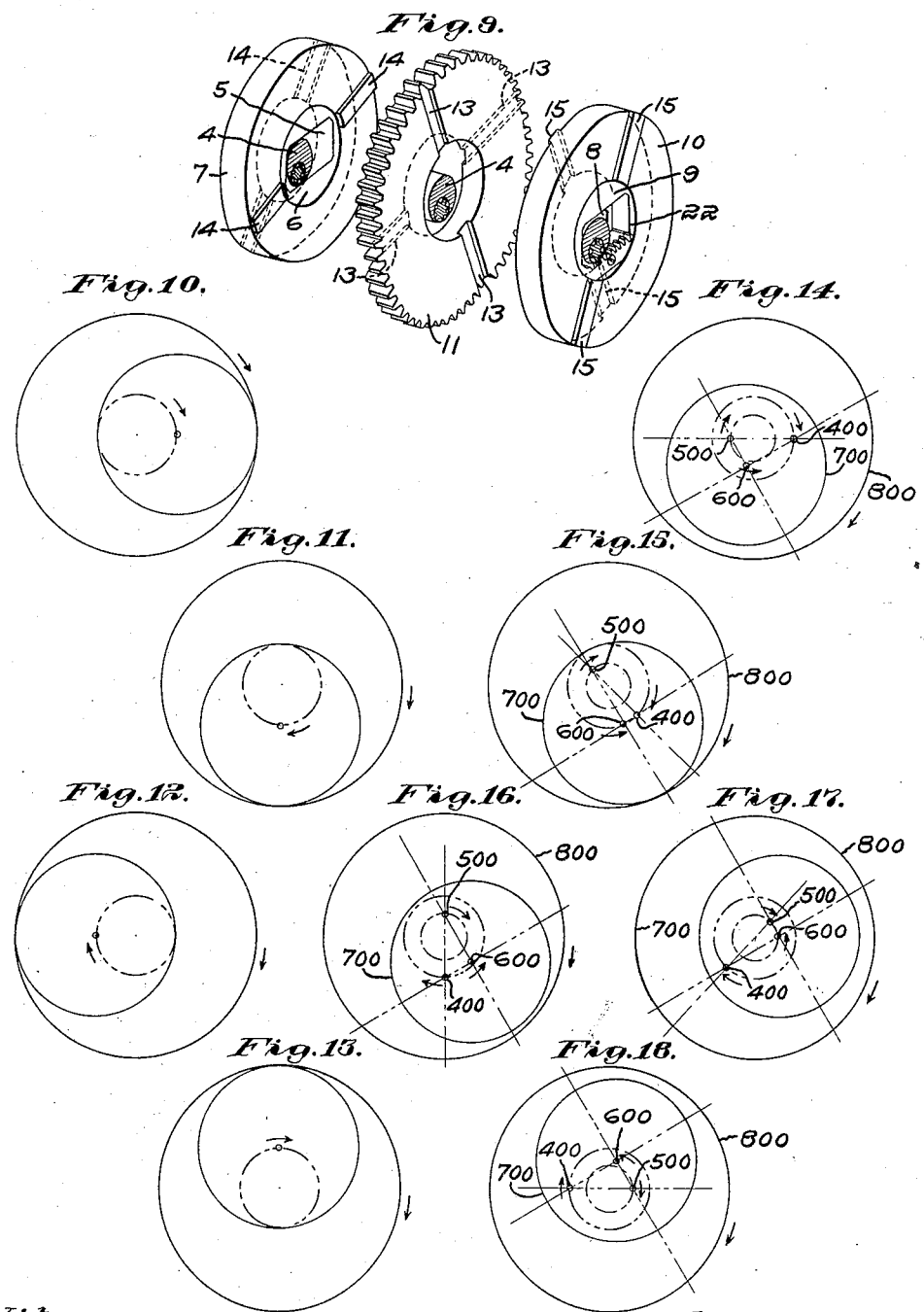

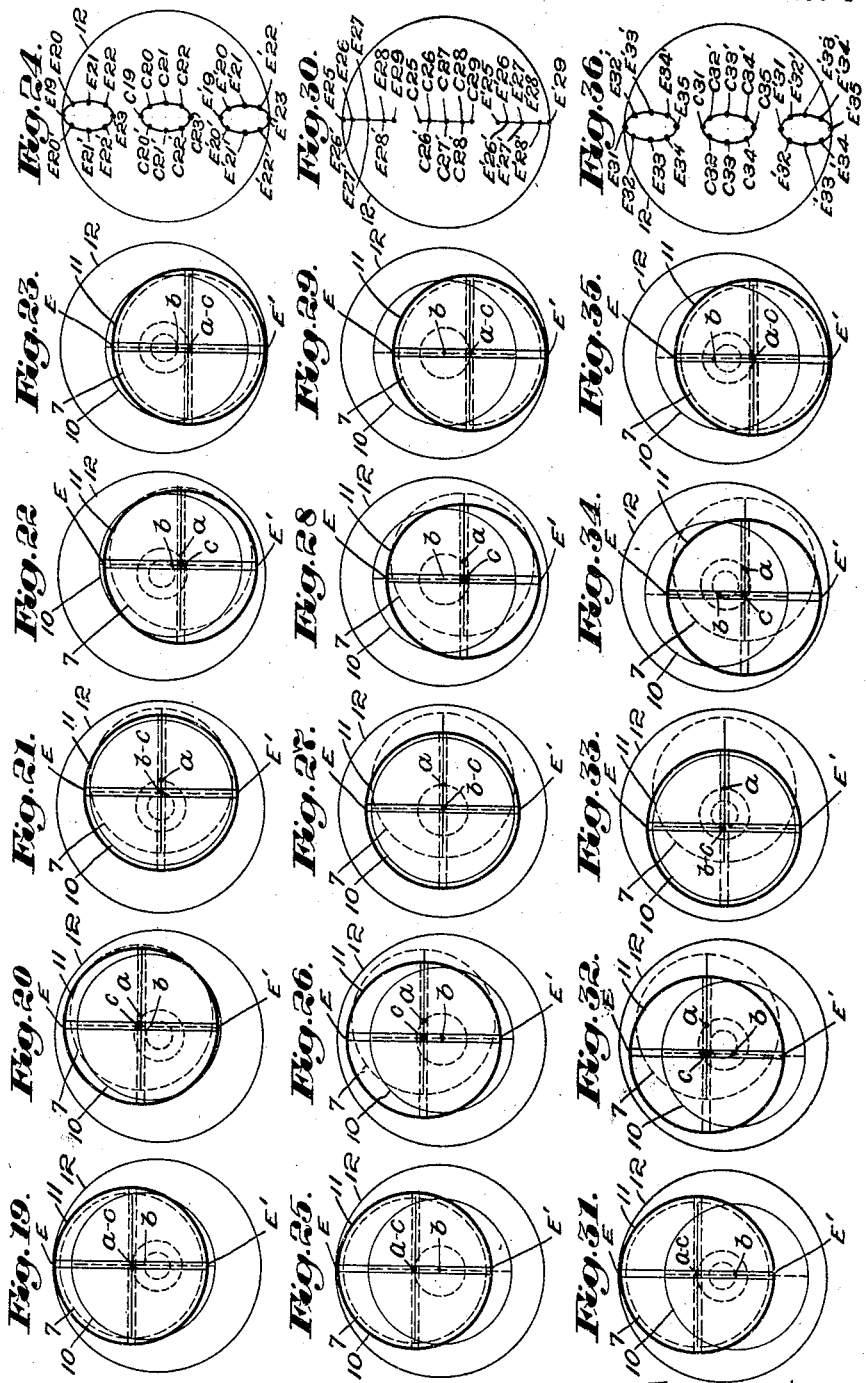

Oct. 9, 1923. 1,470,559
B. HALL
SPEED VARYING MECHANISM
Filed Jan. 20, 1914 6 Sheets-Sheet 5
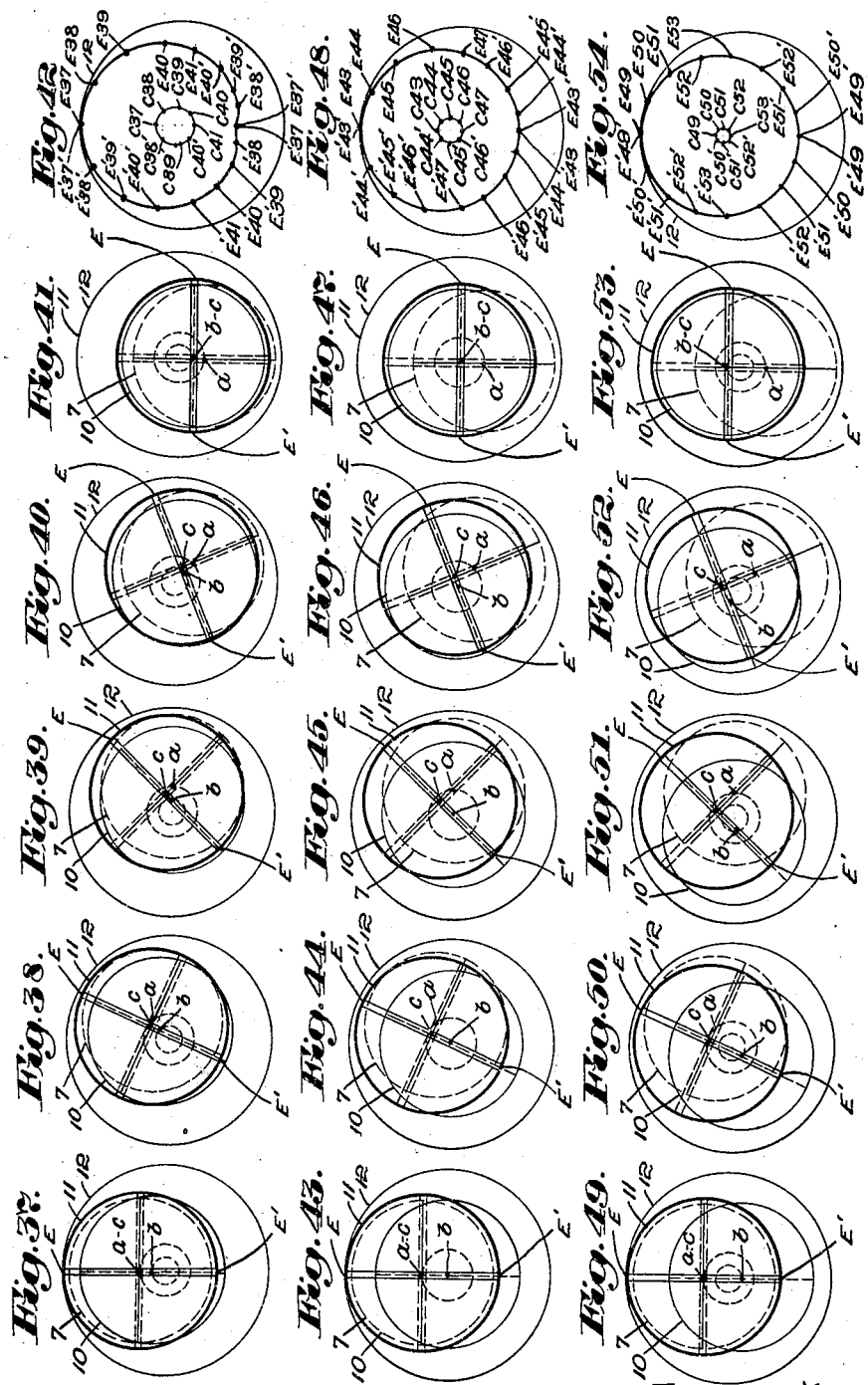
Inventor:
Bicknell Hall.
by Emery, Booth, Janney & Varney
Attys

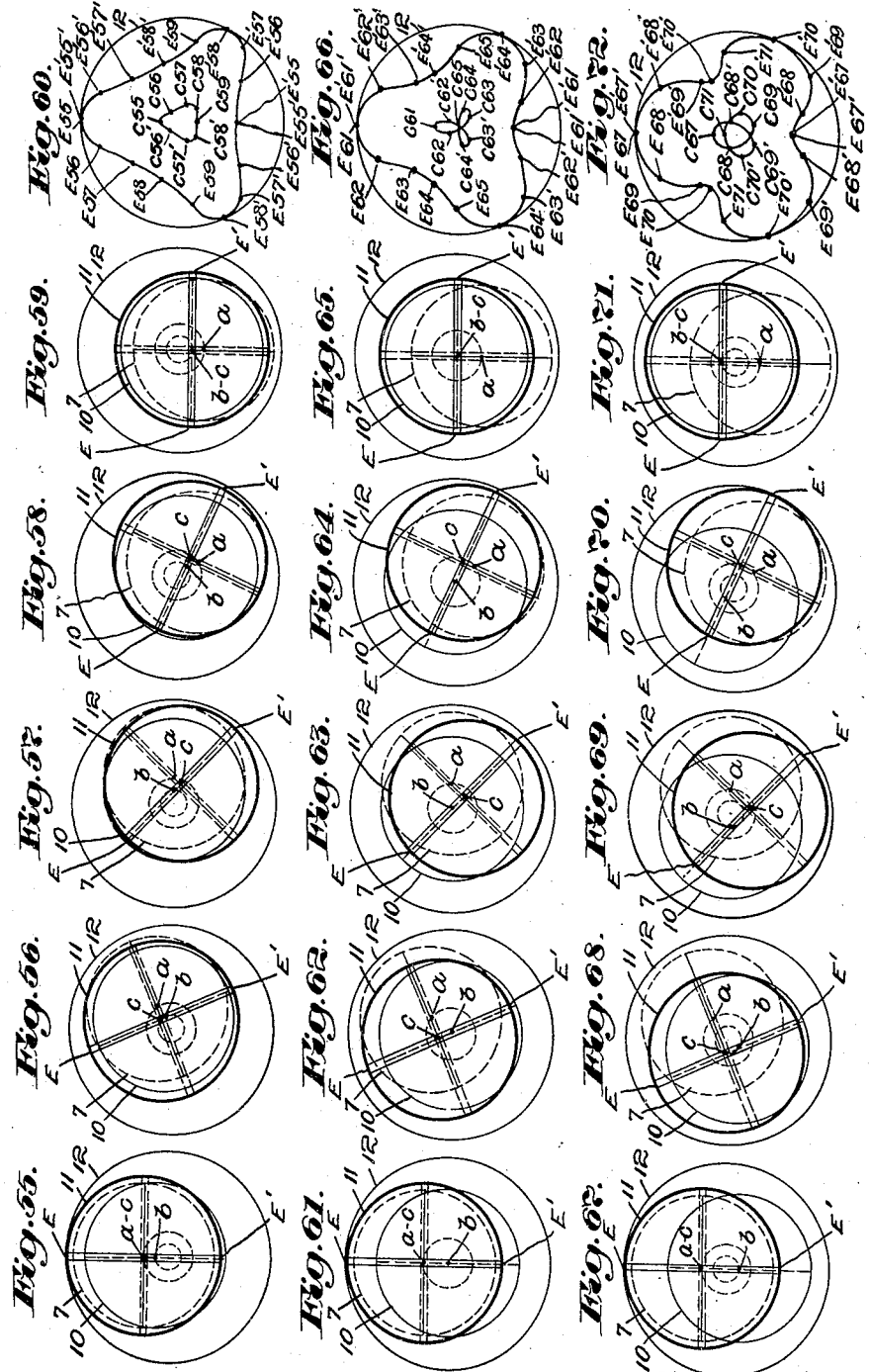

Patented Oct. 9, 1923.

1,470,559

UNITED STATES PATENT OFFICE.

BICKNELL HALL, OF TAUNTON, MASSACHUSETTS, ASSIGNOR TO HALL CO., OF BOSTON, MASSACHUSETTS, A CORPORATION OF MASSACHUSETTS.

SPEED-VARYING MECHANISM.

Application filed January 20, 1914. Serial No. 813,311.

*To all whom it may concern:*

Be it known that I, BICKNELL HALL, a citizen of the United States, and a resident of Taunton, in the county of Bristol and State of Massachusetts, have invented an Improvement in Speed-Varying Mechanism, of which the following description, in connection with the accompanying drawings, is a specification, like characters on the drawings representing like parts.

This application is a refiling, with the same disclosure, of my application Serial No. 420,900, filed March 13, 1908, and renewed as application Serial No. 601,001, on January 5, 1911, said application having become abandoned on September 28, 1913. The present application, however, in part and as to certain common subject matter, is a continuation of my copending application Serial No. 507,616, filed July 14, 1909, renewed Nov. 26, 1917 as Serial No. 204,100 and refiled on June 17, 1918 as Serial No. 240,325 and which said copending application Serial No. 507,616 in part and as to certain common subject matter was in turn a continuation of my first mentioned application Serial No. 420,900 copending therewith and filed on March 13, 1908.

My invention relates to variable speed mechanism, the object of my invention being to improve and simplify such a mechanism, to render the same more useful.

The nature of my invention will best appear from a description of one embodiment thereof selected for illustrative purposes and shown in the accompanying drawings.

Referring to the drawings:—

Figure 2:
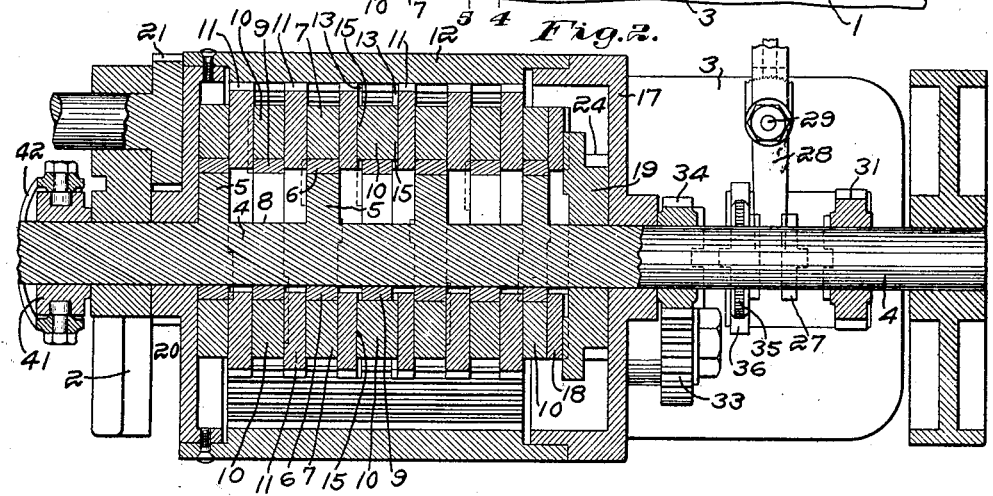
Figure 3:
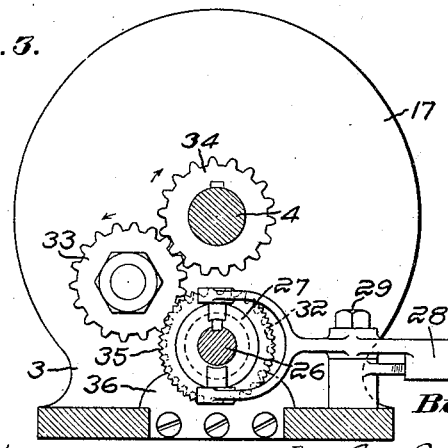
Figure 4:
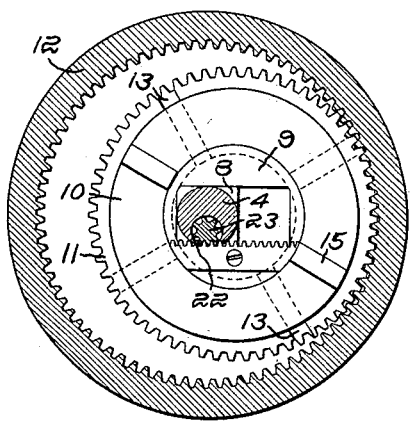
Figure 6:
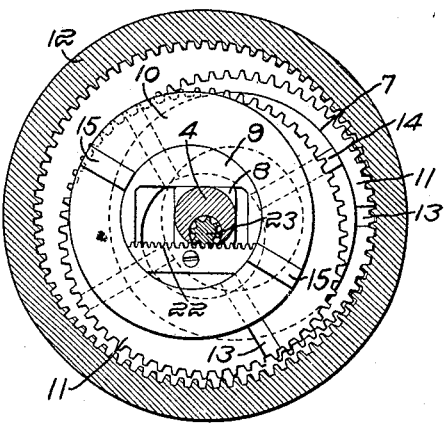
Figure 5:
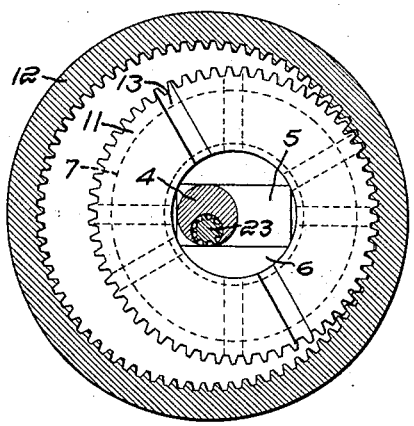
Figure 7:
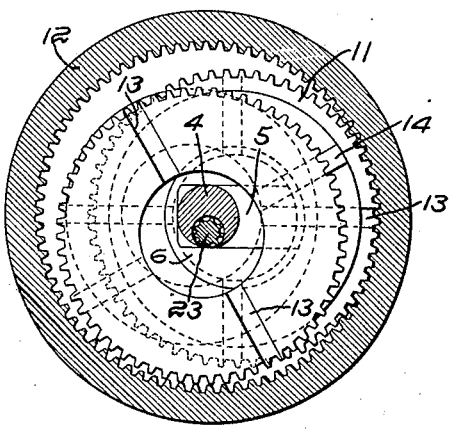
Figure 8:
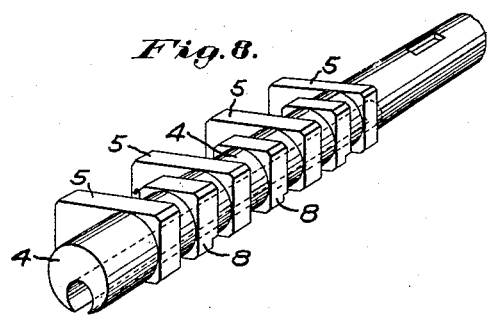

Fig. 1 is a vertical, longitudinal section of the selected mechanism;

Fig. 2, a section on the dotted line 2—2 of Fig. 1;

Fig. 3, a right hand elevation, partial section, of Fig. 1;

Fig. 4, a vertical, transverse section on the dotted line 4—4 of Fig. 1;

Fig. 5, a vertical, transverse section on the dotted line 5—5 of Fig. 1;

Fig. 6, a view similar to Fig. 4, showing the shiftable gears differently positioned;

Fig. 7, a view similar to Fig. 6, showing the shiftable gears differently positioned;

Fig. 8, a perspective detail of the principal shaft;

Fig. 9, a perspective detail showing one of the floating gears;

Figs. 10 to 18, inclusive, are diagrams to be referred to;

Figs. 19 to 72 inclusive, diagrammatic views to be hereinafter referred to and indicating various steps in cycles of movement of the various parts in different positions of adjustment of the adjustable eccentrics.

In the drawings, referring first to Figs. 1 and 2, the base member 1 has erected upon it two standards 2, 3, in which is journaled the main shaft 4, shown in perspective in Fig. 8.

This shaft has formed upon it one or more eccentric seats 5, herein and preferably made oblong and rectangular. Upon these oblong seats are mounted disk bearings 6, shown in Figs. 4, 6 and 9 and also in Figs. 1 and 2. Mounted to rotate freely on these bearing disks are transmission rings or members 7 which, upon rotation of the main shaft 4, are caused to gyrate, like an eccentric strap, through a circular path, the eccentricity of which is that of the bearing disks 6, and is therefore a fixed eccentricity because the oblong seats 5 are unadjustable on the shaft 4.

Between the oblong seats 5 (see Fig. 8) said shaft is provided with squared seats 8. Mounted upon these seats are the slotted disk bearings 9 (see Figs. 4 and 5) similar it may be in all respects to the bearing disks 6 above referred to. Because the seats 8 for the last mentioned disks are squared instead of oblong, said last mentioned disks may be shifted across the shaft within limits imposed by the walls of the oblong slots therein meeting one or the other of the sides of the squared seats upon which they are mounted. The square seats 8 produce, upon rotation of the shaft, the same rotation of their respective disks 9 as do the oblong seats 5 of their disks. The eccentricity of the discs 6, however, is, as stated, fixed, because the oblong seats completely fill the slots thereof, while the eccentricity of the seats 9 may be varied by shifting the same across the shaft, upon and with relation to the square seats which carry them.

Because they are unadjustable, the first mentioned disks 6 might be formed integral with the shaft, they being herein shown separate from said shaft, for convenience in assembling.

Rotatably mounted upon these adjustable eccentric disks 9 are transmission members 10, similar it may be to the transmission member 7 heretofore referred to.

The transmission members 7 having a fixed eccentricity, I shall hereinafter for convenience refer to as the fixed transmission members; while I shall designate the transmission members 10 as adjustable, because their eccentricity may be adjusted at will.

Between the respective pairs of fixed and adjustable transmission members are arranged shiftable gears 11. These gears are not mounted upon the main shaft 4 but float, so to speak, they being provided at their opposite faces with diametral grooves or ways 13; the grooves at one of the sides of the gears standing at right angles to the grooves at the opposite sides thereof (see Fig. 9). The grooves 13 at one of the sides of the floating gears engage diametral ribs 14 on the adjacent faces of the stationary transmission members 7, while the grooves 13 at the opposite faces of said gears engage corresponding ribs 15 upon the adjacent faces of the adjustable transmission members 10.

Thus each transmission member, both stationary and adjustable, is provided at its opposite faces with diametral ribs which engage the corresponding grooves in the floating gears interposed between said transmission members, whereby rotation of the transmission members enforces corresponding and uniform rotation of the floating gears between them and engaged thereby, even though said transmission members and gears are not aligned one with another throughout the series.

The grooves at opposite faces of the floating gears (see Fig. 9) stand at right angles with each other, consequently the adjustable transmission member which engages one face of the gear may be shifted on the shaft 4 to vary its eccentricity more or less with relation to the stationary transmission member at the opposite side of said gear, without losing effective or driving engagement of said transmission members with the gear between the same. The only effect of shifting a transmission member and its rib at one side of a gear relative to that at the opposite side is to cause the floating gear between them to assume a new position, for the axis of the floating gear must always be at the crossing point of the two ribs which engage its opposite faces; and the direction in which the floating gear will shift in taking up its new position will vary according to the alignment of the two ribs and the position of said crossing point relative to the direction of adjustment.

While the grooves at opposite sides of each floating gear (see Fig. 9) are at right angles to each other, the ribs at opposite sides of the transmission members (with one exception, to be hereinafter referred to) are at an angle of but sixty degrees one from the other (Fig. 9). The effect of this is to cause the floating gears, when adjusted outwardly and inwardly upon change of the disk bearings for the adjustable transmission members, to move in different radial directions, spreading outward like a fan, and inward along the same lines, instead of moving outward and inward always in the same direction for a given adjustment, as would be the case if the ribs and grooves were all aligned throughout the entire series.

Where the ribs at opposite sides of the transmission members are offset sixty degrees relative to each other the successive floating gears will move outward and inward along lines sixty degrees one from another. In the embodiment of my invention herein shown, I have employed six floating gears and if the same are offset each sixty degrees from its adjacent gears the effect will be to cause the ribs at opposite sides of the middle transmission member to stand ninety degrees, or at right angles, one relative to the other, which is the exception hereinbefore referred to.

Surrounding the shaft 4, and concentric therewith, is a single internal barrel gear 12, with which the several floating gears mesh. This internal barrel gear is shown as mounted at its left hand end (Figs. 1 and 2) upon and fast to a head 16, loosely journaled upon the shaft 4 just inside the standard 2 referred to. At its opposite or right hand end said internal barrel gear is mounted to turn upon a stationary head 17, formed upon and as a part of the shaft standard 3. In lieu of a single gear 12 with which all the floating gears engage, it is obvious that a series of gears, each meshing with one of the floating gears, might as well be employed, said several gears being connected to produce the effect herein obtained by the use of a single barrel gear.

At the right hand end of the series of gears and transmission members (see Figs. 1 and 2) the right hand transmission member 10, which is fixed, has its diametral rib engaging the diametral groove in the adjacent face of a floating member or ring 18, which need not be a gear, the diametral groove at the opposite outer face of which engages a rib on a member 19 loosely mounted upon and concentric with the shaft 4.

If this member 19 be restrained from rotation, and if all the transmission members be adjusted to have the same eccentricity, then rotation of the shaft 4 will cause the several floating gears to gyrate as one around the shaft 4, but they will not themselves turn, being restrained from turning by connection with the stationary member 19 at the end of the series. The transmission member 18, however, interposed between the non-eccentric member 19 and the eccentric transmission member 10, will gyrate, its center following a circular path whose diameter is equal to the eccentricity of the transmission member 10 next to it.

Assuming all the floating gears 11 to be in mesh with the barrel gear 12, at the portions of their peripheries which are most remote from the axis of the shaft 4, it is evident that rotation of such shaft as described will cause said floating gears, as they gyrate around the shaft, to remain continuously in engagement with and to impart rotative movement to the barrel gear 12, as indicated by the diagrams, Figs. 10 and 13 inclusive. This rotation of the barrel gear, however, will not be at the same rate as that of said shaft; it will be slower by the difference represented by the difference in circumference of the floating gears 11 and said barrel gear 12. In the present instance the barrel gear is approximately one-third larger in circumference than the floating gears 11 consequently the rotation imparted to said barrel gear in the action above described will be approximately one-third slower than the speed of rotation of the shaft 4.

If, now, the adjustable transmission members 10 be shifted on their seats 8, to reduce the eccentricity thereof say one-half, as compared with the eccentricity of the stationary or unadjustable transmission members at the opposite sides of the intervening floating gears, rotation of the shaft 4 as before will produce gyration of said floating gears 11, but since the eccentricity of the transmission members at one of the sides of said floating gears is now less than before, the said gears will have in addition to their path of main gyratory motion as before, a second or auxiliary path gyration within the path of main gyration, which will cause them to be in intermittent engagement only with the outer or barrel gear; that is to say, the floating gears will be moved through what in effect are two complete gyrations within and during each main gyration, due to rotation of the main shaft 4, the result being that they have respectively two effective engagements with the outer or barrel gear at diametrically opposite points of the latter, each of these opposite points moving through a general endless gyration or path into and out of engagement with the barrel gear and between those two points of engagement they entirely lose their engagement therewith. This is illustrated by the diagrams, Figs. 14 to 18 inclusive, which show a corresponding number of arbitrarily selected positions of the gears during one half a rotation of the main shaft 4. In Fig. 14 the centre of the fixed disk bearing 6 is assumed, for example, to be where indicated at 400, and the circle passing through this point indicates the circular path of travel of the eccentric centre of this bearing. The centre of the adjustable disk bearing 9 is assumed, for example, to be where indicated at 500 and the circle passing through it indicates the path of travel of the center of said adjustable bearing in that particular position of adjustment. In Fig. 14 the centre of the floating gear is assumed to be where indicated at 600 and if the shaft be now turned through one-half a rotation the several centres 400, 500 and 600 will travel through paths shown by the arrows and which may be roughly indicated by the several selected positions where the centres are correspondingly marked and it will be observed that the pitch lines 700, 800 of the floating gears and the outer or internal gear 12 are in engagement at only one point, namely, that indicated in Fig. 15, during the entire half rotation of said shaft 4. The same is true during the remaining half rotation of said shaft, the engaging points of the two pitch lines being then at a diametrically opposite point relative to said shaft. In stating that the said pitch lines touch at two diametrically opposite points only, indicating engagement of their respective gear teeth at such points, I do not mean that the engagement is momentary only, because the movement of the teeth of the floating gears to and from the positions of engagement with the teeth of the outer or internal gear is more or less gradual and rolling so that the actual engagement effective for driving from one to the other is perhaps of considerable period of time, depending upon the path of travel of the floating gear. These periods of time vary with the eccentricities of the adjustable disk bearings and their transmission members.

Assuming the adjustable axis 500 to be in adjusted position at the opposite side of the fixed axis 400, as indicated in Figs. 14 to 18 inclusive, what I have termed the secondary gyrations of the floating gears, produced by offsetting the disk bearings and the transmission members at opposite sides of the respective floating gears, are always in a reverse direction from that of the main gyration about and with the shaft 4 when said gears are restrained from rotation by the stationary member 19 at the end of the series. Rotation of said member 19 may, however, according to the direction of its own rotation, modify the path and may even modify the direction of secondary gyration. This is clear from the diagrams, Figs. 14 to 18 inclusive, where it will be observed that rotation of the shaft 4 and its eccentrics also the main gyrations of the floating gear and what would be the resultant normal direction of rotation of the gear 12 are indicated by the arrows next the points 400 and 500, while the center 600 of the floating gear travels in an opposite direction as indicated by the arrow thereat on each of the several figures.

Under such conditions, if the member 19 be rotated clockwise, it will, by corresponding rotation imparted to the reversely gyrating gears 11, reduce the effective drive of the gyratory movement and correspondingly slow down the barrel gear 12. If the clockwise rotation of the member 19 be at the proper speed, the effective drive of the gyratory movement may be completely neutralized and even reversed.

If, on the other hand, under the same conditions of eccentric axis adjustment, said member be rotated in a counter-clockwise direction, the gyratory driving movement of the gears 11 will be accentuated and made proportional to the rate at which the member 19 is driven.

With the member 19 driven counterclockwise, the greater the difference between the eccentricity of the axes of the bearings and transmission members at opposite sides of the respective floating gears, the shaft axis lying between the adjustable and nonadjustable eccentric axes as above, the longer will be the paths of reverse movement of the floating gears. When the secondary gyration is slight the fact that it is in a reverse direction offsets to but a slight degree the forward driving effect due to the gyration of the gears about the main shaft 4, but as the paths of reverse movement increase by adjustment of the adjustable eccentric disk bearings toward coincidence with the axis of the main shaft 4, the offsetting or neutralizing action due to the reverse movements of the gears will become more and more pronounced and will more and more reduce the effective forward driving engagement due to the gyrations until the adjustable transmission members have been adjusted to bring their centers, i. e. the centers of the bearing disks, into coincidence with the center of the shaft 4, the reverse rotation due to the secondary gyration exactly offsets the movement that would otherwise be imparted to the barrel gear by the secondary gyration heretofore referred to, with the result that the barrel gear remains at rest and the engaging teeth of the several floating gears move in effect radially outward and inward, into and out of engagement with the teeth of the barrel gear, but without imparting any rotative movement whatsoever thereto.

The effect of a secondary gyration of the floating gears, due to the offsetting of the eccentric transmission members that drive them, is not only to affect more or less the driving movement of the floating gears, as above described, but also to vary the period of engagement of such floating gears with the outer internal gear 12. For example, with the member 19 either held at rest or in rotation, when the transmission members and their disk bearings are all of the same eccentricity, as in Figs. 10 to 13 inclusive, the floating gears remain continuously in engagement with the barrel gear 12. With said member 19 at rest, as the adjustable disk bearings and their transmission members are adjusted gradually into positions of concentricity with the main shaft the secondary gyration thus imparted to the floating gears changes the paths of travel of the latter, giving them more and more resultant elliptic paths until, when concentricity is reached between the adjustable transmission members and their bearings and the shaft 4, the engaging teeth of said gears again have a radial or out and in movement.

If adjustment of the adjustable transmission members be continued, to carry the centers of their bearing disks across and to the opposite side of the axis of the shaft 4, as in diagrams, Figs. 14 to 18, then the increasing eccentricity thereof as they move away from the center will cause the period of engagement of the floating gears with the barrel gear gradually to increase and simultaneously therewith the turning or driving movement of the floating gears through their paths of secondary gyration will change in direction and will gradually increase and will cause rotation of the barrel gear 12 gradually to increase but in an opposite direction from that previously existing.

Expressed differently, the rotation in a single direction of the floating gears while following the paths of secondary gyration, starting from the period of greatest eccentricity at one side of the shaft 4, may be said gradually to reduce the rotation first imparted to the barrel gear 12 by the main gyrations, until it leaves said barrel gear at rest, and then, as the adjustment is continued to the opposite side of the shaft 4, again gradually increases the rotation until the barrel gear 12 is rotated at its original high speed but in an opposite direction.

If the eccentricity of the transmission members engaging any one floating gear the latter being complete gears were to remain always the same as first above described then but a single floating gear would be required because it would always remain in mesh with the outer internal or barrel gear, and would impart thereto always a differential movement, equivalent to the difference in circumference between the floating gear and the outer gear.

When, however, the eccentricity of one of the transmission members is varied relative to the other, as last above described, to cause the secondary gyratory path of movement of a floating gear within the path of main gyration and which causes said floating gear to have intermittent engagement only with the outer or barrel gear, it is obvious that if a single floating gear only were used the outer or barrel gear would receive an intermittent movement and not a constant movement such as is desired; by constant I mean continuous—without coming to rest. To obviate this and provide the desired continuity of movement, my invention contemplates a plurality of floating gears and the grooves in the engaging transmission members therefore are offset in series as described through angles of sixty degrees or thereabouts, to cause them to be projected radially at such angles of separation as will cause one floating gear to engage the outer or barrel gear before another is disengaged therefrom, the result being that the outer gear receives constant and continuous engagement and movement from one or another of the floating gears; that is to say, while each floating gear makes periodical engagement only with the outer gear, the latter receives continuous engagement and movement from the series taken as a whole.

A plurality of gears being employed for the purpose of obtaining continuity of movement from a plurality of periodical engagements, there is no operating necessity for complete gears 11, since segmental portions only of said gears are actively availed of; the aggregate of the portions amount in effect to a single full gear when the adjustable eccentrics are adjusted into their extreme outward position. Said gears 11, then, may be considered as segmentally effective gears, although for convenience they have been here shown as full gears.

I have found it convenient to employ in the present instance six floating gears, but a less or different number may be employed, the angles of offset between the transmission ring grooves for successive gears along the series being varied according to the number of gears employed, so as to insure always engagement between some one of the floating gears and the outer or barrel gear.

Should a range of speed be desired in excess of what it is practicable to obtain by means of the floating gears and outer or barrel gear alone, the same may be obtained by suitable gearing from the outer or barrel gear. For example, in the present instance I have formed upon the hub of the head 16 of the barrel gear a gear 20, which drives one or more gears 21, and the ratio of the diameter of which may be such as to obtain any desired speed from the barrel gear 12. For instance, while it may be found impracticable to attempt to obtain more than a variation of from nothing up to one-third of the rotative speed of the main shaft 4 in either direction from the floating gears and barrel gear alone, this variation may be increased up to many times that of the shaft 4 by the use of gearing such, for example, as suggested, operated from the barrel gear 12. It is to be understood, of course, that the variation possible by means of the floating gears and the outer or barrel gear alone may be much greater than that above referred to merely as an example, but the latter is sufficient to illustrate the point that whatever the variation obtainable by the floating gears and barrel gear alone, such variation may be widely changed, either increased or diminished, by suitable gearing in addition thereto. While for descriptive purposes I have referred to the pulley 2 as receiving the applied power and to the barrel gear 12 as the member from which the variable speed is obtained obviously within the spirit of my invention the power may be applied to said barrel gear and the mechanism reversely operated, variable speed being taken off, if desired, from the member 19.

The adjustment of the eccentric disks that carry the adjustable transmission members may be effected in any desired manner. In the present instance (see Figs. 4 and 5) I have formed the lower walls of the oblong slots in such disks 9 to present rack teeth 22, or a rack may be inserted for the purpose as is the case in the present construction. These racks in the several bearing disks 9 are in mesh with a long pinion 23. This pinion is contained within the shaft 4 and is exposed at one face thereof next the racks to be engaged therewith, so that in any position of the shaft 4 rotation of the pinion 23 within said shaft will cause the eccentric disks 9 to slide across the shaft to vary the eccentricity of the said disks to or from either extreme, as hereinbefore suggested. The pinion 23 may be turned by any desired means, accessible from without. For example, the long pinion 23 (see Fig. 1) has its end outside the bearing 2 provided with a spiral groove 40, which receives an internal, spiral spline upon a sliding collar 41 splined upon the shaft 4 and engaged by a handle 42. The collar rotates freely with the shaft 4, but while rotating and without interfering in the least with such rotation, if the lever 42 be swung with its fulcrum the rotating collar will be moved longitudinally in one or the other direction and thereby, through the spline and groove referred to, cause a relative rotation of the long pinion 23 in and relative to the shaft, 4, to effect adjustment of the disk bearings as and for the purpose described. Thus, while the mechanism is operating the rate of speed produced or derived thereby or therefrom may be varied from and to either extreme, as above described, rendering it possible to vary at will the speed of a device or machine and determine the direction thereof, or bring it to rest. with all the facility of a friction gear but with all the merit of a positive gear drive.

In the construction and mode of operation heretofore described the transmission member 19 at the right end of the series (Figs. 1 and 2) has been assumed in some instances to be held stationary and it then holds the floating gears from rotation. Since this member controls the movements of the various floating gears, it is evident that if said member be itself rotated in one or the other direction it will transmit such rotative movement to the several floating gears throughout the series and correspondingly modify the movements imparted by the latter to the barrel gear.

This may be accomplished in convenient manner, I having herein shown the hub of said transmission member 19 provided with a gear wheel 24, driven at the under side (Fig. 1) by a pinion 25 on a shaft 26, journaled in suitable bearings on the base 1 of the mechanism. This shaft 26 has splined upon it a clutch member 27, operated as by a lever 28 (see Fig. 2) fulcrumed at 29.

At its right hand end said clutch member 27 is adapted to engage and be turned by a gear wheel 30, loosely mounted on said shaft 26 and driven by a mating gear 31 fast on the shaft 4. At its opposite or left hand end said clutch member 27 is adapted to engage a gear 32 loose on the shaft 26 and driven through an intermediate gear 33 (see Fig. 3) by and from a gear 34 fast on said shaft 4. Thus the gears 30 and 31 constitute a direct driving train between the shaft 4 and the clutch shaft 26, while the gears 32, 33 and 34 constitute a reverse driving train between the said shafts, and according as the sliding clutch member 27 is slid to the right or to the left into engagement with the direct or the reverse trains described, will the clutch shaft 26 and the transmission member 19 be rotated in one or the other direction to impart corresponding rotative movements to the several floating gears throughout the series.

If the transmission member 19 be rotated to cause the floating gears to rotate in the same direction in which they gyrate it will augment or increase the rotation imparted to the outer or barrel gear 12. If, on the contrary, said transmission member be rotated reversely by the gear train described to cause the floating gears to be turned in a direction opposite to that in which they gyrate it will cause a reduction in speed of rotation of the barrel gear 12.

It will be clear that the movement of the floating gears in the path of main gyration around the main shaft will always be at the speed of rotation of the main shaft, but that the movements imparted to the floating gears from the transmission member 19, by the train mechanisms described will vary the paths of the engaging teeth of such gears and the secondary gyrations resulting from adjustment of the concentrics, this variation in secondary gyration mainly determining the changed speed imparted to the barrel gear. With the sliding clutch member 27 in mid position, it is restrained from rotation, thereby to restrain the shaft 26 and transmission member 19 similarly against rotation, by means of a series of teeth 35 on the periphery of the clutch member 27, which slide into engagement with a correspondingly toothed rack 36 on the base 1. The clutch member slides out of engagement with this locking rack when moved into either extreme position for engagement with either the direct or reverse trains described.

It will contribute to an understanding of the mode of operation of the described mechanism in its various conditions of adjustment if reference be had to the several series of diagrammatic views, Figs. 19 to 72 inclusive.

Of these diagrammatic views Figs. 19 to 24 assume the movable eccentrics to be adjusted to bring their axes at approximately one-half the distance from extreme outward eccentricity inward toward the axis of the shaft 4, and also assume the member 19 to be held from rotation and consequently holding the several floating gears 11 against rotation about their own axes. Said floating gears may, however, gyrate along elliptical paths within the circular path of main gyration that would be followed by said floating gears were all the adjustable eccentric bearings moved into positions of extreme outward adjustment or eccentricity coincident with the non-adjustable eccentric bearings.

Referring to said Figs. 19 to 24 inclusive, the pitch line of the outer or barrel gear 12 is marked 12. The pitch line of one of the floating gears 11 is represented by the heavy full line and is marked 11. The circles 7 and 10 in dotted line and light full line respectively represent, for purposes of description, the outside circles or circumferences of the transmission members 7 and 10, the member 10 being mounted upon a bearing of adjustable eccentricity, the member 7 upon a bearing of fixed eccentricity.

Upon the pitch line circle 11 of the floating gear, I have indicated two diametrically opposite points marked E and E' representing selected points of engagement between the teeth of the floating gear and the internal teeth of the barrel gear 12. The smaller concentric circles near the center of the pitch line 12 represent the paths through which travel the centers or axes $a$ and $b$ respectively of the fixed and adjustable eccentric transmission members 7 and 10, the letters $a$ and $b$ indicating the positions of said centers in the various diagrams.

The pairs of crossing lines, one pair in full and the other in dotted lines, represent the grooves at opposite faces of the floating gear 11, those in full lines representing the groove at the upper face of said gear, and the dotted lines the groove at right angles thereto at the opposite or under face, viewing said figure.

The single solid and dotted lines between the pairs of lines just referred to represent the tongues upon the transmission members that engage the grooves in the floating gear and determine the position of the latter. It will be observed that the pairs of crossing lines terminate with the pitch circle of the floating gear, indicating that they represent the grooves upon the opposite faces of that gear, while the single lines representing the single tongues, terminate with the circles 7 and 10, which respectively represent the fixed and the adjustable eccentric transmission members upon which said tongues are respectively formed.

It will be observed that the circle indicating the circular path through which the center $b$ of the adjustable eccentric bearing supporting the transmission member 10 will pass, is but half the diameter of the circle through which the center $a$ of the unadjustable eccentric bearing of the transmission member 7 will pass when the former is adjusted, as stated, into mid-position between that of extreme outer eccentricity and a position of concentricity with the axis of the shaft 4.

In Fig. 19 it will be noted that the center $c$ of the floating gear 11 and the center or axis of the transmission member 7 of fixed eccentricity coincide at the point $a$, as indicated by the letters $a-c$ placed against said point.

If now, assuming the floating gear 11 to be restrained from rotation about its own axis or center, the main shaft be turned clockwise through 45 degrees the parts diagrammed in Fig. 19 will be moved into the positions indicated by the diagram Fig. 20 wherein the center $a$ of the fixed eccentric bearing has been moved to the right into the position there marked $a$, the position of the center $b$ of the adjustable eccentric has also been moved to the right into the position there marked $b$ and the center $c$ of the floating gear 11, which coincides with the crossing point or axis of the right-angled grooves on its opposite faces has assumed a position there marked $c$, while the engagement between the floating gear 11 and barrel gear 12 at the point E has been broken by the movement of the point E upon the periphery of the floating gear downward and to the right, as indicated, said floating gear being wholly disengaged from the barrel gear.

If now, the main shaft be turned further clockwise through 45 degrees, the parts will assume the positions indicated in Figure 21, the floating gear being still out of engagement with the barrel gear.

Turning the main shaft again clockwise through another 45 degrees will cause the various parts to assume the positions indicated in Figure 22, with the floating gear still out of engagement with the barrel gear, but approaching the latter at a point approximately opposite the point of initial engagement assumed in Fig. 19.

Turning the main shaft through still another 45 degrees, or through an aggregate of 180 degrees from the starting point, Fig. 19, brings the parts into the positions indicated in Fig. 23 where the point E' upon the floating gear and which lies diametrically opposite the point E of first engagement, Fig. 19, is seen to be in engagement with the barrel gear at a point on said barrel gear that lies opposite for the moment. The point of engagement E' of the barrel gear is not however diametrically opposite the point E of the barrel gear, although it is opposite in its relation to the device as a whole. The reason it is not at a diametrically opposite point upon the barrel gear 12 is that in moving from the position, Fig. 19, to the position, Fig. 23, the floating gear 11 has moved in a gyratory path and has consequently imparted to the barrel gear with which it was engaged a certain increment of movement in the same clockwise direction before it became first completely disengaged therefrom and in the act of re-engagement at the point E'.

During the period of disengagement, also, the other floating gears forming a part of the mechanism, have in like manner intermittently engaged the same barrel gear and have each contributed their driving movement to the barrel gear, so that by the time the point of full engagement of any one floating gear has been transferred from the point E to the point E' the barrel gear will have been moved through a substantial distance determined by the extent of eccentricity between the fixed and adjustable eccentric bearings.

In moving from the position, Fig. 19, to the position Fig. 23, the main shaft has been turned through one-half a rotation only; turning said shaft through a full rotation would cause the parts to assume corresponding positions in reverse order but in an upward travelling direction at the left of the center of the shaft, as already illustrated in the downward movement at the right.

In Fig. 24, I have indicated the changing positions of the points E and E' at the top and bottom of a floating gear in the course of a complete rotation of the main shaft of the device, said points being numbered $E^{19}$ to $E^{23}$ and $E^{22'}$ to $E^{20'}$ for the point E at the top of said figure, and similarly for the point E' at the bottom of the figure, and similarly also for the center $c$ near the center of said figure, and representing the positions assumed by the points of engagement in the successive Figures 19 to 23 and the corresponding positions in the further upward movement of the parts during the remaining half rotation of the main shaft.

It will be observed that these two points of engagement E and E' follow in effect each its own gyratory path, and, having reference to points of engagement between the floating gear and barrel gear, there are in effect at each rotation of the main shaft two gyrating engaging points or two gyrating paths of engagement accompanying each rotation of the main shaft.

The capacity of the mechanism to transmit rotary motion at different speeds will now be understood by referring particularly to Figs. 19 and 20.

In the movements described in the diagrams, Figs. 19 to 23, I have assumed the adjustable eccentric bearing to have been adjusted into mid-position between its extreme position of outward eccentricity and coincidence with the axis of the main shaft so that as said shaft was turned the floating gear 11 was gyrated to the right and before becoming disengaged from the barrel 12 would have moved the latter a distance also to the right, generally represented by the distance through which the engaging point E is shown to have been moved in a line to the right of its starting position Fig. 19.

If the adjustable eccentric bearing had been permitted to remain in its position of extreme outward eccentricity coincident with the center $a$ of the fixed eccentric bearing—as shown in Figs. 10 to 13 inclusive—gyration of the floating gear to the right or clockwise would not have disengaged it from the barrel gear 12; it would have moved through a complete circle, which has been termed the path of main or maximum gyration, while retaining continuous engagement with the barrel gear, the point of engagement shifting around the floating gear as the gyration progressed. The action of the two engaging surfaces would then have been a rolling one notwithstanding the floating gear itself does not rotate, but merely gyrates while being held against rotation. It will be noted that in Figs. 19 to 23, the respective diametral lines remain always parallel to themselves, since the transmission members and floating gears are assumed to be restrained from rotation on their own axes.

As the eccentricity of the adjustable eccentric is gradually reduced the period of engagement between the floating gear and the barrel gear correspondingly decreases and the floating gear 11 therefore contributes less and less driving movement to the barrel gear; and as each floating gear thus contributes less and less driving movement to the barrel gear, the latter will receive, during a complete cycle of travel of the floating gears, less movement in the aggregate from all the floating gears, and consequently will be turned at less and less speed during a complete cycle or rotation as compared with that at which the main shaft is rotated. Thus the speed imparted to the barrel gear may be varied, as compared with that of the main shaft, by varying the eccentricity of the adjustable eccentric bearings, and so varying the secondary or elliptical paths of gyration of the floating gears and the resultant length of the engagement periods between such gears and the common outer or barrel gear.

When the parts have been adjusted so that the axes of the adjustable eccentric bearings are coincident with the axis of the main shaft, no rotative or driving movement whatsoever will be imparted to the outer or barrel gear 12, because the elliptical or secondary paths of gyration will have been flattened to substantially a straight diametral line causing the floating gears to move radially into and directly out of engagement with the barrel gear without imparting to the latter any lateral or driving movement whatsoever.

This will be made clear by following the diagrammatic Figures 25 to 30 inclusive.

In said figures the same numerals and reference characters indicate the same parts as in Figures 19 to 24 inclusive. In Figures 25 to 30 however the adjustable eccentric transmission member 10 has been adjusted by moving the center of its bearing inwardly until it coincides with the centers of the shaft 4 and of the barrel gear 12. The position of the center of said movable eccentric is indicated at $b$. It will be noted that in the present series of diagrams there is but a single small dotted line circle concentric with the shaft and with the barrel gear 12, namely the circle indicating the circular path through which the center $a$ of said fixed eccentric bearing travels. The diameter of said small concentric circle is of course always the same since said eccentric $a$ is not adjustable.

In Figure 25 it will be observed that the center $c$ of the floating gear 11 and the center $a$ of the unadjustable eccentric transmission member 7 coincide as indicated by the letters $a$—$c$ placed thereagainst. The floating gear 11 is assumed to be in engagement with the outer or barrel gear 12 as indicated at the point E.

Assume now that the floating gear 11 be restrained from rotation upon its own axis or center, as was also assumed in connection with Figures 19 to 24, and that the main shaft be rotated in a clockwise direction, in which direction it is always rotated in all the diagrammatic figures. In Figure 26 the rotation of said shaft has been carried through an angle of 45°, the same as in passing from Figure 19 to Figure 20 in the previous series of diagrams. The center $a$ of the fixed eccentric has moved to the right into the position there marked $a$, the position of the center $b$ of the adjustable eccentric remaining unmoved since it was and remains in coincidence with the center of the shaft. The center $c$ of the floating gear 11, which must always coincide with the crossing point of the ribs upon the fixed and adjustable transmission members respectively, has moved to the position there marked $c$. It will be noted that the movement of said center $c$ has been in a straight line which is a diameter of the gear 12.

In Figure 27 the main shaft has been rotated through a further 45 degrees, the parts assuming the positions there indicated. The floating gear 11 is still out of engagement with the barrel gear 12, the center $c$ of said gear now coinciding with the center of the shaft and of the adjustable transmission member $b$ since the crossing of the mutually perpendicular ribs now occurs substantially at the center or axis of the shaft 4.

Continuing the rotation of the main shaft through another 45 degrees will cause the various parts to assume the positions indicated in Figure 28, with the floating gear still out of engagement with the barrel gear but approaching the latter at a point diametrically opposite the point of initial engagement assumed in Figure 25. It will be noted that the path of movement of the center $c$ of said floating gear continues to be a straight line passing through the center of the shaft and of the barrel gear.

Turning the main shaft through a still further angle of 45°, making an aggregate of 180 degrees or a one-half rotation from the starting point, Figure 25, will bring the parts into the positions indicated in Figure 29 where the point E' upon the floating gear and which lies diametrically opposite the point E of said gear is seen to be in engagement with the barrel gear. Said engagement of the point E' in this instance occurs at a point upon the barrel gear 12 which is diametrically opposite the previous point of engagement of the point E upon said barrel gear. This is so because the floating gear 11 has travelled in a true diametral path out of engagement at the point E and into engagement at the point E'. The teeth of the floating gear 11 therefore have no circumferentially effective or driving engagement with the barrel gear which accordingly remains stationary. In progressing through the positions indicated in Figures 25 to 29 inclusive, the main shaft has been turned through one-half a rotation only. Turning said shaft through a further one-half rotation to complete a full rotation would cause the parts to assume corresponding positions in a reverse order, the center $a$ of the fixed eccentric bearing and its transmission member moving upwardly at the left of the center of the shaft as already illustrated in its downward movement at the right.

In Figure 30 the shifting positions of the points E and E' at the top and bottom respectively of the floating gear and also the positions of its center $c$ are indicated through the course of a complete rotation of the main shaft—the parts being adjusted as in Figs. 25 to 29— said points being numbered $E^{25}$ to $E^{29}$ and $E^{28'}$ to $E^{26'}$ for the point E and similarly for the points E' and $c$, and representing the positions assumed by said points of the floating gear in the successive Figures 25 to 29 and the corresponding positions in the further upward movement of the parts during the last half rotation of the shaft. It will be observed that the paths of travel of said two points are in this adjustment of the parts, straight radial lines, indicating that the floating gears move radially into engagement with the barrel gear and then directly and radially out of engagement therewith without imparting driving or turning movement to said barrel gear. The capacity of the mechanism to transmit rotary motion at zero speed with the speed of the main drive shaft remaining constant, will thus be apparent from said Figures 25 to 30; in other words the parts may be adjusted, as described, so that no motion at all is imparted to the barrel gear constituting the driven element.

Referring now to Figures 31 to 36, in said figures the center of the adjustable eccentric bearing $b$ has been adjusted still further in the same direction in which it was moved in changing its position from that shown in Figure 19 to that shown in Figure 25. In Figures 31 to 36 the adjustment has carried the center $b$ across and below the center of the main shaft until it is positioned eccentrically of said shaft by a distance equal to one-half the eccentricity of the center $a$ of the fixed eccentric bearing, but said two centers $a$ and $b$ now lie upon opposite sides of the center of the main shaft 4. The positions of the parts illustrated in said figures are thus similar to those shown in Figs. 14 to 18.

In the series of diagrams now under consideration the various parts are marked in the same manner as in the previous diagrams and in the successive figures the main shaft has also been assumed to have been rotated through successive angles of 45 degrees, also in Figures 19 to 30 already described and in the same or clockwise direction. As in said previous diagrams, the floating gear 11 is still assumed to be restrained from rotation upon its own axis.

It will be noted that in the three series of diagrams so far considered, namely Figures 19 to 24, Figures 25 to 30 and Figures 31 to 36, the diagrams in vertical alignment assume the same extent of rotation of the main shaft, and also that in any diagram lying in the same vertical row, the position of the fixed eccentric bearing and its center $a$ is the same.

Passing to the right in Figures 31 to 36, it will be observed that the points E and E' of the floating gear 11 move downwardly, but to the left, in a manner exactly the reverse of the successive positions of said points shown in Figures 19 to 23. Only a one-half rotation of the shaft always in clockwise direction, has been illustrated in said figures but it will be understood that a succeeding half rotation of said shaft will carry the parts through corresponding positions in reverse order but in an upwardly travelling direction at the right of the center of the shaft.

The successive positions of the points E and E' at the top and bottom of the floating gear and of its center $c$ are indicated in Figure 36, said figure showing the positions of said points during the course of a complete rotation of the main shaft. Said points are numbered $E^{31}$ to $E^{35}$ and $E^{34'}$ to $E^{32'}$ for the point E and correspondingly for the point E' and center $c$. It will be noted that said two points of engagement E and E', as was the case in Figures 19 to 24, follow in effect each its gyratory path whereby, having reference to points of engagement between the floating gear and the barrel gear, there are in effect two gyrating engaging points or two gyratory paths of engagement at each rotation of the main shaft. In Figures 31 to 36 however the direction in which said points E and E' travel along said paths is counterclockwise or the reverse of the direction of rotation of the main shaft and also the reverse of the direction of travel of said points in Figures 19 to 24. Accordingly the barrel gear 12 receives a rotation in a counterclockwise direction thus illustrating the capacity of the mechanism to transmit rotary motion in a direction the reverse of that of the driving element. The speed of said rotation, as will be apparent from a comparison of the various diagrams, is dependent upon the extent of eccentricity of the adjustable transmission member 10. With the floating gears restrained from rotation upon their own axes and with the center $b$ of said adjustable transmission member moved to a position at the opposite side of the center of the main shaft from the position occupied by the center $a$ of the fixed transmission member, the rotation imparted to the barrel gear constituting the driven element is in a direction the reverse of that of the main shaft.

In the three series of diagrams already described, namely Figures 19 to 36 inclusive, the transmission members 7 and 10 and floating gear 11 were assumed to be held against rotation upon their own axes by means of the member 19 which was in that instance presumed to be prevented from rotation as by the rack 36 and accordingly restrained the various floating gears and intervening transmission members 7 and 10 connected therewith. Referring now more particularly to the group of figures numbered 37 to 54, it will be noted that said figures are arranged in three horizontal rows or series, comprising respectively, Figures 37 to 42, Figures 43 to 48 and Figures 49 to 54.

In the first series of said group on Sheet 5 of the drawings the adjustable eccentric bearing is assumed to be positioned with its center offset from the center of the main shaft 4 by a distance equal to one-half the eccentricity of the fixed eccentric bearing and offset to the same side of the shaft precisely in the manner as assumed in Figures 19 to 24. In the present instance however the two eccentric straps or transmission members 7 and 10 instead of being prevented from rotating are assumed to be rotated each about its own center through the medium of the direct gear train including gears 30 and 31 already described and whereby said eccentrics are rotated in the same direction as the main shaft and at a speed assumed to be one-half that of said shaft.

The successive diagrams of the series, Figures 37 to 41, represent as in the previous series of diagrams successive rotations of the main shaft always in a clockwise direction through angles of 45 degrees, but in addition to such rotation of the main shaft each eccentric strap or transmission member in the successive figures has been rotated through $22\frac{1}{2}$ degrees of $\frac{1}{16}$ of a rotation, upon its own axis and in the same direction in which the main shaft is rotated. The center $c$ of the floating gear, which is always determined by the crossing point of the ribs upon the transmission members at opposite sides thereof, assumes successively the positions indicated in the successive Figures 37 to 41, illustrating the relative positions of the parts through a one-half rotation of the main shaft and a one-fourth rotation of the transmission members upon their respective axes. It will be noted that the point E at which the floating gear is assumed to be in engagement with the barrel gear as shown in Figure 37, has in Figure 41 moved through a one-fourth rotation with respect to the center of said floating gear, and also that no other point upon said gear has entered into engagement with the barrel gear during the course of the half rotation of the main shaft illustrated in Figs. 37 to 41. The same is true during the succeeding half-rotation of the shaft. In other words there is but a single engagement of any one floating gear with the barrel gear 12 during a full rotation of the main shaft and the same point E and E' upon the floating gear engages only once in two full rotations of the main shaft. However, the distance through which the driven element or barrel gear has been moved during that period is greater than that imparted thereto during a like period with the floating gear restrained from rotation as in Figs. 19 to 24. It will be noted in Fig. 38 that the point E upon the floating gear has only just become disengaged from the outer gear, the period of engagement of said point having been several times longer for the same angular rotation of the shaft 4 than it was in Figs. 19 to 24; (compare particularly Figs. 20 and 28).

Accordingly it will be understood that the transmitted rotary movement received by the barrel gear in the same angular interval of rotation of the main shaft 4 is in Figs. 37 to 42 substantially longer or is at a substantially increased speed over that received during a like interval in Figs. 19 to 24. This is true in spite of the fact that there are fewer engagements of each floating gear with the barrel gear during a single rotation of the main shaft because each engagement is much longer and therefore imparts a correspondingly longer rotary movement and at a resulting higher speed to the barrel gear.

In Fig. 42 are illustrated the successive positions of the points E and E' and also of the center $c$ of the floating gear during one complete rotation of the main shaft, the position of point E being marked $E^{37}$ to $E^{41}$ for the first half rotation and $E^{40'}$ to $E^{37'}$ for the next half rotation and the positions of the point E' of the center $c$ during the same periods being similarly marked, the numbers corresponding to the ordinals of the diagrammatic figures. In said Figure 42 it will be seen that the point E upon the floating gear at the end of a complete rotation of the main shaft is positioned diametrically opposite its initial position shown in Fig. 37 but is still out of engagement with the barrel gear. At the same time the point E' has entered into engagement with the barrel gear as indicated at $E'^{37'}$.

Referring now to the series of diagrams constituting Figs. 43 to 48 inclusive the parts are therein assumed to have been adjusted into the same relative positions as in the diagrammatic Figs. 25 to 30 inclusive. That is, the adjustable eccentric bearing has been moved inwardly until its center $b$ coincides with the center of the main shaft. While in Figs. 25 to 30 the transmission members and floating gear were restrained from rotation upon their own axes, in Figs. 43 to 48 said members are assumed to be rotating each about its own center and in the same direction as the rotation of the main shaft but at one-half the speed of the latter, as was assumed in connection with Figs. 37 to 42.

Rotation of the main shaft in a clockwise direction through successive angles of 45° will now bring the parts into the positions illustrated in the successive Figs. 43 to 47. The corresponding parts are indicated by the same characters as in the previously described figures. It will be observed that the point E upon the floating gear moves in a path generally similar to that in which it traveled in Figs. 37 to 42 and in the same, and clockwise, direction whereby rotation also in a clockwise direction is imparted to the barrel gear. The successive positions of the points E and E' and also of the center $c$ of the floating gear itself during a full rotation of the shaft and with the adjustment of the parts as last assumed are shown in Fig. 48. In this instance, however, the length of travel or speed of rotation of the barrel gear is less than that imparted to it in Figures 37 to 42 for the same angular movement of the main shaft 4.

A comparison of Figs. 38 and 44 will show that the length of the engagement of the point E with the barrel gear is appreciably less in Fig. 44 with a consequent reduction in the travel and speed received by the outer or barrel gear. This result may also be observed from a comparison of Figs. 43 and 44 with Figs. 19, 20 and 25, 26 respectively. In Fig. 44 the bodily movement which would be received by the floating gear were it restrained from rotation upon its own axis would be in a straight line as in Fig. 26 and would therefore contribute no effective driving action. In Fig. 44 the rotary motion imparted to the barrel gear results primarily from the rotation of the floating gear upon its own axis rather than from the bodily gyratory movement thereof and is consequently less than the motion imparted to the barrel gear in Fig. 38 wherein said gear receives a turning movement which is the result of the rotation of the floating gear upon its own axis and also of the bodily gyratory movement of the floating gear similar to that illustrated in Fig. 20 and which it would receive were it prevented from rotating.

Turning now to Figs. 49 to 54 the parts are therein assumed to be in the same relative positions of adjustment as in Figs. 31 to 36; that is, the adjustable transmission member 10 has been moved still further and across the center of the main shaft until its own center $b$ is eccentrically positioned at a distance equal to one-half the eccentricity of the fixed transmission member 7 but at the opposite side of the axis of the main shaft. In the present series of diagrams said transmission members are also assumed to be receiving rotation about their own respective centers and in the same direction as that of the main shaft and at one-half the speed of the latter, said rotation being produced through a direct train of gearing such as gears 30, 31 and the member 19. The positions of the parts during successive rotations of the main shaft through angles of 45° and under the conditions assumed, are shown in Figs. 49 to 53, while in Fig. 54 are shown the positions assumed by the points E and E' and also by the center $c$ of the floating gear during a complete rotation in a clockwise direction of the main shaft.

In said figures it will be observed that the points E and E' still travel in a clockwise direction and consequently impart rotation to the barrel gear in the same direction. The speed of said imparted rotation, however, is now less than in the series of diagrams just previously considered, viz, Figs. 43 to 48. Said reduction in speed results from the fact that the length of the engagement of said points E and E' with the barrel gear is now still smaller as will be apparent from a comparison of Fig. 50 with Fig. 44 just above the same.

A comparison of the three series of diagrams last described and constituting the three horizontal rows of figures on Sheet 5 will make clear the capacity of the mechanism to impart rotary movement at variable speeds to the driven element or barrel gear 12, which speeds are different from the speeds received by said barrel gear in the three series of diagrams, Figs. 19 to 36 inclusive. With the parts in the same positions of relative adjustment but with the transmission members on the one hand restrained from rotation about their own centers and on the other hand with said members rotated upon their own centers in the same direction as the rotation of the main shaft and at one-half its speed, the speed of the rotary motion transmitted is greater in the last instance.

Referring now more particularly to the three series of diagrams found on Sheet 6 of the drawings and comprising respectively, Figs. 55 to 60; Figs. 61 to 66 and Figs. 67 to 72, the adjusted positions of the parts therein are the same as in corresponding series on the two previous sheets. In Figs. 55 to 72, however, the eccentric transmission members and the floating gears between the same are assumed to be rotated each about its own center but in a direction the reverse of the rotation of the main shaft and at a speed still assumed to be one-half that of said shaft. That is, during a rotation of the main shaft in a clockwise direction through 45° or a $\frac{1}{8}$ rotation each of the transmission members is rotated about its own center in a counterclockwise direction through an angle of $22\frac{1}{2}°$ or a $\frac{1}{16}$ rotation. Said reverse rotation of the transmission members is obtained by rotation of the member 19 through the reverse gear train which includes the gears 32, 33 and 34.

Having reference particularly to Figs. 55 to 60, in which the corresponding parts are similarly indicated as in the previous figures it will be observed that the points E and E' upon the floating gear now move in a general direction which is counterclockwise. Consequently the outer or barrel gear 12 receives a resultant rotation which is also in a counterclockwise direction and reverse to the direction of rotation of the main shaft. Figs. 55 to 59 show only a one-half rotation of the main shaft and in Fig. 60 I have indicated the positions assumed by the points E and E' and also by the center $c$ of the floating gear during a full rotation. Under the conditions assumed said points have more than a single engagement with the barrel gear during one rotation of the shaft, which engagements are of a comparatively short length as will be clear from a comparison of Figs. 55 and 56 and also as is well shown in Fig. 60.

In Figs. 61 to 66 the transmission members are again assumed to be rotated about their own centers in a counterclockwise direction and at the same speed as Figs. 55 to 60 but the adjustable member 10 has been adjusted downwardly until its center is in coincidence with the center of the shaft 4. In said figures the movement of the points E and E' is again in a counterclockwise direction and in a path generally similar to the path of movement of said points in Figs. 55 to 60. The number of engagements is also the same in the present series of figures but the length of said engagements is greater than in Figs. 55 to 60. This is clear from inspection of Fig. 62 as compared with Fig. 56. Consequently the resultant counterclockwise rotation imparted to the barrel gear during the same angular movement of the main shaft is at greater speed than with the parts adjusted as in Figs. 55 to 60.

In the series of diagrams across the bottom of Sheet 6, Figs. 67 to 72, the center of the adjustable eccentric bearing has been moved across and to the opposite side of the center of the main shaft to a distance equal to one-half the eccentricity of the fixed eccentric bearing precisely as in the series of diagrams constituting Figs. 31 to 36 and also Figs. 49 to 54. In Figs. 67 to 71 the positions of the parts during four successive ⅛ rotations or an aggregate half rotation of the main shaft are indicated, while in Fig. 72 I have shown the positions of the points E and E' and of the center c of the floating gear at successive ⅛ rotations throughout a complete rotation of the main shaft. It will be noted that the points E and E' again travel in a counterclockwise direction and consequently rotate the barrel gear in a counterclockwise direction but at a greater speed than the series of diagrams last above described, viz, Figs. 61 to 66, since the length of the respective engagements for like intervals has been further increased. This will be clear from a comparison of Figs. 68 and 62.

Stating the matter differently, with the parts in the positions of adjustment assumed in Figs. 67 to 72 and with the transmission members rotated in a counterclockwise direction the bodily gyratory movement of the floating gear as in Figs. 31 to 36 and the rotation of said floating gear upon its own center are both in the same, that is, counterclockwise direction and accordingly supplement each other with a resulting comparatively high speed of rotation imparted to the barrel gear and also in a counterclockwise direction and consequently in a direction the reverse of the rotation of the main shaft.

With the parts in the position of adjustment assumed in Figs. 61 to 66 the rotation imparted to the driven barrel gear is also in a counterclockwise direction but at a less speed than in Figs. 67 to 72 because with the parts adjusted as in said Figures 61 to 66, the floating gear would have no bodily gyratory movement were it restrained from rotation, or rather would move merely in a radial line as in Figs. 25 to 30, and the effective driving movement of said gear is produced primarily by its rotation in a counterclockwise direction about its own center. That is, there is little or no drivingly effective gyratory movement of the floating gear either to supplement or neutralize the rotative movement of said gear upon its own center.

Again, with the parts in the positions of adjustment assumed in Figs. 55 to 60 the rotation received by the driven barrel gear is also in a counterclockwise direction but is still less than in Figs. 61 and 66 because the bodily gyratory movement which would be received by the floating gear were it prevented from rotating, as was assumed in Figs. 19 to 24, would be in a clockwise direction while the rotation of said floating gear at the assumed speed about its own center would be in a counterclockwise direction and therefore said two movements counteract or tend to neutralize each other but with a resultant driving movement in a counterclockwise direction.

Obviously my mechanism is not restricted to rotation of the transmission members at one-half the speed of the main shaft as has been assumed for convenience in describing the foregoing diagrammatic figures. The selected speed of rotation imparted to said transmission members may be such that with a given speed of rotation of the main shaft and with the parts adjusted as assumed in Figs. 55 to 60, the counterclockwise rotation of said members would exactly offset or neutralize any driving effect of the floating gear due to its bodily gyration in a clockwise direction, with the result that no speed would be imparted to the barrel gear. In the same manner in Figs. 49 to 54 the driving effect of the floating gears due to rotation about their own centers in a clockwise direction might precisely offset the driving effect of said floating gears due to their gyration in a counterclockwise direction, again with a resultant zero rotation of the barrel gear 12.

Thus the mechanism is capable of imparting rotary motion to the driven element in either direction from zero up to the maximum, said variations being effected in two entirely independent manners, viz, by adjustment of the variable eccentric into positions of greater or less eccentricity, and also by rotating the floating gears upon their own centers in one or the opposite direction and at different speeds.

With the floating gears restrained from rotation, as assumed in Figs. 19 to 36 inclusive, the number of steps or changes through which the speed can be varied herein between the maximum resulting from continuous engagement of the floating gears and a minimum where the adjustable eccentric bearings are aligned with the main shaft, depends upon the character of the engaging surfaces respectively upon the barrel gear and the several floating gears; if the engaging surfaces be toothed as here shown, the number of changes or steps would be determined by the coarseness of the teeth, because obviously an adjustment could then only be made in steps represented by the pitch of the teeth, and the smaller the teeth the greater the number of steps and the finer the gradations in passing from one range of speeds to another. Obviously this gradation may be made as refined as desired by reducing the size and increasing the number of teeth.

In the device illustrated herein the driving belt is applied to the driving pulley 2, which, with its shaft 4 and eccentric bearings 6 and 9, transmit rotary motion to and through the other parts of the device, hence said driving pulley, its shaft and eccentric bearings may together be considered as the driving element, or any one of them might be so considered, upon the understanding that the effective axis of the driving element is that from which motion is transmitted to the eccentric straps or transmission members 7 and 10 and the gears 11. Said effective axis is a resultant of the fixed eccentricity of the strap 7 and the adjustable eccentricity of the strap 10 as heretofore described, and is variable according to the adjustment of the eccentric bearing 9. In other words, the effective axis of the driving member or group of members constituting what I have herein referred to as the driving element of the device, is the gyrating axis of the floating transmission gear or gears 11, the path of said gyrating movement being variable by the relative adjustment of the axes of the eccentric bearings 6 and 9.

In the device illustrated, power is taken from the barrel 12 or from the gear 20 at one end thereof, which barrel and gear, together or separately may be considered the driven element of the device. Said adjustable eccentric bearings 9 constitute an effective movement-imposing portion of the driving element which portion is adjustable relatively to said driven element into positions of greater or less eccentricity.

Operatively interposed between the driving and driven elements are the groups of transmission members or eccentric straps 7 and 10 and the gears 11 positioned and operated by them and which serve to transmit motion and power from the driving element to the driven element. Each transmission gear 11 and the eccentric straps 7 and 10 which position it and move it, may conveniently be termed a driving unit for transmitting motion from the driving to the driven elements. These driving units—in which one or both of the eccentric straps corresponding to 7 and 10 may be common to two driving units in a sense that they may be common to the gears 11 at their opposite sides—are distributed about the axes of the driving and driven elements and are operatively connected with one of said elements, herein the driving element, in a crank-like manner, that is to say, as the driving pulley 2 is rotated it causes the eccentric driving members to operate the driving units in the manner of a crank, as contrasted with a toggle or other action, said crank furnishing the connection between said driving element and the driving unit or units.

With the eccentric bearings 9 adjusted into positions of less than the maximum eccentricity, the outer end of each driving unit, where the gear 11 engages the internal teeth of the barrel 12, makes intermittent engagement with said barrel and the points of such intermittent engagement change or are adjustable around the pitch line circle or circumference of said barrel 12 since at each succeeding engagement said gear 11 engages a new tooth or teeth more or less removed from that or those previously engaged, the points of engagement progressing around the said barrel gear or driven member in steps determined as to the period, spacing, or rapidity of engagement according to the extent of relative eccentricity of the above mentioned movement-imposing portion of the driving element and the driven element.

In engaging with and disengaging from said barrel gear each driving unit approaches and recedes from said element in a rolling manner, that is to say, the action is such that the two members, so to speak, roll together and away from each other; not only is the action of meeting and receding thereby made easy and susceptible of ready and effective guiding, but the period of effective normal driving contact or engagement between the same may thereby be prolonged. Such engagement and disengagement of the effective driving parts relieves the same of unnecessary frictional or driving engagement between successive points of intermittent engagement and renders also adjustment of the transmission from one to another speed more easy, mechanical and efficient. Thus, while the engagement is intermittent, it varies in duration according to the extent of said relative eccentricity above described and according to the variation of transmission obtained thereby or therefrom.

An important characteristic of the transmission device described is that the driving action or thrust of the driving unit to and upon the driven element is in a line normal to the abutment or thrust-receiving face or formation on the driven element with which it is engaged during the driving period; in the present instance that abutment face is the effective face of the internal tooth on the driven element with which the driving unit, for the time being, is engaged. An arrangement, that permits the driving thrust to be delivered upon the abutment face of the driven element in a line normal or substantially normal to said face, renders the device positive in its action and free from heat generating conditions that characterize an ordinary clutch or gripping arrangement for delivering a driving thrust from the driving unit to the driven member.

If the driving thrust be exerted in a direction not normal to the abutment face of the engaged element, the moment the angle of repose at either side a line truly normal to that abutting face be passed, the driving thrust would tend to produce a lateral slipping action between the driving unit and said face, which would require resistance by some friction clutch or other device. So long, however, as the driving thrust is within or between the angles of repose at the sides of a line truly normal to the abutment face, said line of thrust may be said to be substantially normal to said face and may be employed as freely as if it were a true normal, to deliver positive driving force from one part to its engaged part without liability to lateral slip and without requiring any supplementary clutches or other devices to maintain the engagement.

Where the driving units and driven elements are provided with gear teeth, as in the present instance, the range of adjustment in speed due to relative adjustment of the effective movement-imposing portion of the driving element and the driven element into positions of greater or less eccentricity is, as stated, limited to a step adjustment between ranges and to a maximum number of steps equal to the difference in the number of teeth within and upon the barrel 12 and upon the gear 11. Obviously, the finer or smaller the gear teeth, the shorter the steps in the adjustment and the greater their number and consequent approach toward a capacity for universal adjustment.

Each of the transmission gears 11 in its movement toward and from its engaged element 12 moves in an endless path until the limit of movement is reached where it moves directly across in a straight line as stated, and whatever its movement, whether in a straight line or in an endless elliptical path of greater or less minimum diameter of ellipse, the driving units at their segmentally effective driving portions approach and recede from the engaged element in a general direction that is substantially normal to that element in the region of that engagement.

As already observed, the points of engagement of the driving unit with the engaged element shift variably around the latter according to the extent of said relative eccentricity.

The driving units and driven element 12 whether actually engaged or for the time being disengaged, are always in juxtaposition where they may be readily guided into the next engagement by suitable means as here provided. In the present instance it will be observed that during the periods of actual disengagement between the teeth of the transmission gears 11 and the element that is engaged thereby, said gears are positively held or guided by the radiating ribs and grooves between the eccentric straps and the gear that is controlled thereby.

A mechanism such as herein described has an extensive field for its use, it being applicable to any purpose where a variable speed is desired with a constant gear engagement, there being no possible slip at any point in the range of speed from nothing to the limit in either direction, because there is never a loss of positive engagement between the teeth of the driving and driven gears.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A speed varying mechanism containing driving and driven elements continuously geared one to the other by means of a plurality of intermittently engageable gears, and means for imparting to said gears variable gyratory movements in variable paths about the axis of the driving element.

2. A speed varying mechanism containing driving and driven elements, continuously geared one to the other by means of a plurality of intermittently engageable gears and means for imparting to said gears gyratory movements in one or an opposite direction in variable paths about the axis of the driving element.

3. A speed varying mechanism containing driving and driven elements continuously geared one to the other by means of a plurality of intermittently engageable gears, means for imparting to said gears gyratory movements in one or an opposite direction in variable paths about the axis of the driving element and means optionally to restrain from rotation or to rotate said gears while gyrating.

4. A speed varying mechanism containing driving and driven elements continuously geared one to the other by means of a plurality of optionally intermittently or continuously engageable gears.

5. A speed varying mechanism containing driving and driven members, one of which comprises a plurality of intermittently engageable members having effective segmental driving portions, and means to impart variable gyratory movements to said members.

6. A speed varying mechanism containing driving and driven elements, one of which comprises a plurality of shiftable gears and means to shift them to vary the path of movement thereof about a given axis, a rotary member having an axis fixed relatively thereto, and means connecting said shiftable gears in any position thereof with said rotary member.

7. A speed varying mechanism containing driving and driven elements, one of which comprises a plurality of shiftable gears and means to shift them to vary the path of movement thereof about a given axis, the other of said elements comprising a single gear in mesh with the gears of said first element, a rotary member having an axis fixed relatively thereto, and means connecting said shiftable gears in any position thereof with said rotary member.

8. A speed varying mechanism containing driving and driven elements, means including a plurality of intermittently engageable gears continuously to connect said driving and driven elements one to the other and means for imparting to said gears gyratory movements in variable paths about the axis of the driving element.

9. Speed varying mechanism comprising in combination a drive shaft, a driven element, and positive gyratory gearing connections between said drive shaft and driven element, said gearing being adjustable to effect the driving of the driven element at a greater, or less or equal speed with respect to said drive shaft and also to effect the driving of the driven element in either direction.

10. Speed varying mechanism comprising in combination a drive shaft, a driven element, and gyratory gearing connections between said drive shaft and driven element, said gearing being adjustable to effect the driving of the driven element at a greater or less speed than said drive shaft and also to effect the driving of the driven element in either direction with reference to the drive shaft.

11. A speed varying mechanism containing driving and driven elements, means including a plurality of intermittently engageable gears continuously to connect said driving and driven elements one to the other, and means for rotating said intermittently engageable gears at different rates of speed.

12. A speed varying mechanism containing driving and driven elements, and means including a plurality of optionally intermittently or continuously engageable gears continuously to connect said driving and driven elements one to the other.

13. A speed varying mechanism comprising driving and driven elements, said driving element including eccentrics of fixed and adjustable eccentricity respectively, a circumferential series of driving members intermediate said elements and adapted to rotate said driven element, and means connecting each of said members with a fixed and with an adjustable eccentric whereby said members are caused to move in a path which is the resultant of the paths of said eccentrics.

14. A speed varying mechanism containing driving and driven elements, one of which comprises a plurality of shiftable gears, transmission members engaging the sides thereof, and means to vary the relative eccentricity of the transmission members at opposite sides of the respective gears thereby to vary the resultant travel of said gears.

15. A variable speed mechanism comprising driving and driven elements, one of which comprises a plurality of shiftable gears, transmission members engaging opposite sides of the respective gears, means to vary the relative eccentricity of transmission members at opposite sides of the respective gears, means to turn said transmission members in circular paths, and means engaging said transmission members laterally to control rotation of said gears.

16. A speed varying mechanism containing driving and driven elements, one of which comprises a plurality of gears, and means to impart main and secondary gyratory movements to said gears.

17. A speed varying mechanism containing driving and driven elements one of which comprises a plurality of gears, and means to impart to the latter both main and secondary gyrations, the latter in either direction as desired.

18. A speed varying mechanism comprising a shaft, a plurality of pairs of fixed and adjustable eccentric bearings thereon, transmission members mounted on said bearings, floating gears in lateral engagement with and between the transmission members of respective pairs of fixed and adjustable eccentric gears, and an outer gear in mesh with said floating gears and having a speed varying in its relation to that of rotation of said shaft according to the adjustment of said adjustable eccentric bearings.

19. A speed varying mechanism comprising a shaft, fixed and adjustable eccentrics thereon, transmission members on said eccentrics, floating gears between said transmission members and connected with the latter by rib and groove connections, means to vary the eccentricity of said adjustable eccentric bearings, and an outer gear in engagement with said floating gears.

20. A speed varying mechanism comprising a shaft, fixed and adjustable eccentric bearings thereon, means operative from within said shaft to vary the adjustment of said adjustable eccentric bearings, transmission members on said bearings, floating gears between adjacent transmission members and operated thereby through rib and slot connections, and an outer gear in engagement with said floating gears.

21. A speed varying mechanism comprising a shaft, fixed and adjustable eccentric bearings thereon, means operative from within said shaft to vary the adjustment of said adjustable eccentric bearings, transmission members on said bearings, floating gears between adjacent transmission members and operated thereby through rib and slot connections, an outer gear in engagement with said floating gears, and controlling means engaging a transmission member at one end of the series.

22. A speed varying mechanism comprising a shaft, fixed and adjustable eccentric bearings thereon, means operative from within said shaft to vary the adjustment of said adjustable eccentric bearings, transmission members on said bearings, floating gears between adjacent transmission members and operated thereby through rib and slot connections, an outer gear in engagement with said floating gears, with means for holding or rotating the transmission member at one end of the series as may be desired.

23. A speed varying mechanism comprising a shaft, fixed and adjustable eccentric bearings thereon, means operative from within said shaft to vary the adjustment of said adjustable eccentric bearings, transmission members on said bearings, floating gears between adjacent transmission members and operated thereby through rib and slot connections, an outer gear in engagement with said floating gears, means for holding the transmission member at one end of the series or rotating it in either direction at will.

24. A speed varying mechanism comprising driving and driven elements, one of which contains a plurality of gears, means to impart both main and secondary gyratory movements to said gears, and means to determine the direction and rate of said secondary gyratory movements.

25. A speed varying mechanism comprising in combination, the following instrumentalities, shaft 4, fixed and adjustable eccentric bearings 6 and 9 upon said shaft with means to adjust said adjustable bearings, the transmission members 7 and 10 respectively supported by said bearings, the floating gears 11 interposed between and operatively connected to said transmission members, and the outer gear 12 with which said gears 11 are drivingly engageable.

26. A speed varying mechanism comprising in combination the shaft 4, the fixed and adjustable eccentric bearings mounted thereon and means to adjust the adjustable bearings, transmission members carried by said fixed and adjustable bearings respectively, the floating gears 11 between and drivingly connected to said transmission members, the outer gear 12 surrounding said gears 11, and the member 19 connected with a transmission member to control the movement of said transmission members about their own axes.

27. A speed varying mechanism comprising in combination the shaft 4, the fixed and adjustable eccentric bearings mounted thereon, means to adjust the adjustable bearings, transmission members carried by said fixed and adjustable bearings respectively, the floating gears 11 intermediate and operatively connected to said transmission members, the outer gear 12, surrounding said gears 11, the member 19 connected with a transmission member, and means to hold or to rotate said member 19 thereby optionally to restrain from rotation or to rotate said transmission members upon their axes.

28. A speed varying mechanism comprising in combination the shaft 4, the fixed and adjustable eccentric bearings mounted thereon, means to adjust said adjustable bearings, transmission members carried by said fixed and adjustable bearings respectively, the floating gears 11 between and drivingly connected with said transmission members, the outer gear 12 surrounding said gears 11, the member 19 loose upon the shaft 4 and connected with a transmission member to control movement of said transmission members about their axes, and means to hold or to rotate said member 19 in one or in opposite directions thereby optionally to restrain from rotation or to rotate said transmission members in either direction upon their axes.

29. A speed varying mechanism comprising in combination, the shaft 4, the fixed and adjustable eccentric bearings carried by said shaft 4, the transmission members mounted on said fixed and adjustable bearings respectively, the floating gears 11 intermediate and operatively connected with said transmission members, the outer gear 12 surrounding said gears 11 and the speed changing train including the gear 21 operatively connected to said outer gear 12.

30. A driving mechanism containing driving and driven elements, one of which comprises a gyratory gear, and means to shift it edgewise into and out of engagement with the other of said elements.

31. The combination with the shaft 4, of fixed and adjustable eccentric bearings thereon, transmission members mounted on said bearings, a floating gear between said transmission members and operatively connected thereto, and an outer gear in engagement with said floating gear.

32. A speed varying mechanism containing driving and driven elements, one of which comprises a shiftable gear, and means to shift it to vary the path of movement thereof about a given axis, a rotary member having an axis fixed relatively thereto, and means connecting said shiftable gear therewith.

33. A speed varying mechanism containing driving and driven elements, one of which comprises a plurality of gyratable gears, a rotary member having an axis fixed relatively thereto, and means connecting said gyratable gears therewith to impart to said gears gyratory movements in variable paths about the axis of the driving element.

34. A speed varying mechanism containing driving and driven elements, one of which comprises a plurality of intermittently engageable gears, and means to impart variable gyratory movements to said gears.

35. The combination with the shaft 4, the fixed and adjustable eccentric bearings and transmission members thereon, the floating gears 11 intermediate said transmission members and operatively connected thereto, outer gear 12 surrounding said floating gears 11, the pinion 23 carried by said shaft 4 and engaging said adjustable eccentric bearings, and means to rotate said pinion relatively to said shaft thereby to adjust said bearings.

36. The combination with the shaft 4, the fixed and adjustable eccentric bearings and tranmission members thereon, the floating gears 11 intermediate said transmission members and operatively connected thereto, outer gear 12 surrounding said floating gears 11, the pinion 23 mounted in said shaft 4 and engaging said adjustable eccentric bearings, and the spirally splined means for rotating said pinion relatively to the shaft thereby to move said adjustable eccentric bearings radially of said shaft.

37. A speed varying mechanism containing driving and driven elements, and connecting means including a plurality of intermittently engageable gears, and cooperating means to impart to one of the elements variable, gyratory movements about a variable center.

38. In a speed varying mechanism, driving and driven members, one of which comprises a plurality of gyratory gears, means for adjusting said gears about a fixed axis, and means for imparting to said gears uniform rotation.

39. A speed varying mechanism comprising, in combination, a shaft, gears surrounding said shaft but not carried thereby, members mounted on said shaft and in direct engagement with said gears, one or more of said members being adjustable in relation to the axis of said shaft, and means for giving said members uniform rotation.

40. A speed varying mechanism comprising a shaft, bearings therefor, fixed and adjustable eccentric bearings on said shaft, crank means operative from within said shaft to vary the adjustment of said adjustable eccentric bearings, transmission members on said bearings, floating gears between the fixed and adjustable eccentric bearings and operated thereby through rib and slot connections, an outer gear in connection with said floating gears, and means for holding or rotating said transmission members in either direction at will.

41. A speed varying mechanism comprising driving and driven elements, said driving element including a shaft having fixed and adjustable eccentric bearings, means to adjust said adjustable bearings, and means including intermittently engageable members distributed about the axis of said shaft and variably positionable conjointly by said fixed and adjustable bearings continuously to rotate said driven element at speeds dependent upon the eccentricity of said adjustable bearings.

42. A speed varying mechanism containing co-axial driving and driven elements and cooperating means continuously to drive the latter from the former in either direction as desired, said cooperating means including two eccentrics, whereof one at least is variable.

43. A speed varying mechanism containing co-axial driving and driven elements and co-operating means continuously to drive the latter from the former, said co-operating means including a connecting member and two eccentrics acting conjointly upon said member, one at least of said eccentrics being variable.

44. Transmission mechanism for converting constant rotary into variable speed rotary motion comprising in combination an operatively associated train of elements including a shaft, an ultimately driven element and an annular member having an internal engaging surface surrounding said shaft, eccentric means upon said shaft and having a movement-imposing portion adjustable relatively to said annular member into positions of greater or less eccentricity, driving units distributed about the axis of said shaft and included in said train of elements, each of said units having circumferentially adjustable intermittent rolling engagement with said annular member thereby to effect rotation of said ultimately driven element at a speed dependent upon the degree of said eccentricity.

45. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements, and means to produce intermittent, circumferentially adjustable, rolling engagement of each of said units and the other of said elements.

46. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements, and means to produce intermittent circumferentially adjustable rolling engagement of each of said units and the other of said elements, said units and engaged element having engaging surfaces substantially normal to the line of thrust thereon.

47. A speed varying mechanism comprising in combination, driving and driven members, the latter having teeth, and a pair of eccentrics, one of which is fixed and the other of which is of variable eccentricity, and a member between and conjointly positionable by said eccentrics and having teeth to mesh with those of said driven member.

48. A speed varying mechanism comprising in combination, a driving member, a driven member having an internal driving surface, two members of relatively variable eccentricity upon said driving member, and a member intermediate and conjointly positioned by said two members and having a driving formation to engage said internal driving surface.

49. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements and having adjustable rolling engagement with the other, and means to cause each driving unit to approach and recede from effective driving engagement with the element it engages.

50. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements and having circumferentially adjustable rolling engagement with the other, and means to impart to said driving units movement in an endless path which approaches and recedes from said engaged element.

51. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements and having circumferentially adjustable rolling engagement with the other, and means to cause each driving unit to approach and recede from effective driving engagement with the element it engages in a direction substantially normal to the latter in the region of engagement.

52. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements and having circumferentially adjustable rolling engagement with the other, and means to cause each driving unit to approach and recede from effective driving engagement with the element it engages, said means causing the points of engagement to shift variably around said engaged element according to the extent of said relative eccentricity.

53. Variable speed transmission means comprising in combination rotatable driving and driven elements. one of said elements having an effective movement-imposing portion adjustable relatively to the other element into positions of greater or less eccentricity, driving units distributed about the axes of said elements, each driving unit having crank-like connection with one of said elements and rolling engagement with the other of said elements, said units and engaged element having engaging abutment surfaces substantially normal to the line of driving thrust thereon.

54. Variable speed transmission means comprising in combination rotatable driving and driven elements, one of said elements having an effective movement-imposing portion adjustable relatively to the other element into positions of greater or less eccentricity; driving units distributed about the axes of said elements, each driving unit having crank-like connection with one of said elements and driving engagement with the other of said elements, said units and engaged element having engaging abutment surfaces substantially normal to the line of driving thrust thereon, and means to cause each driving unit intermittently to approach and recede from its engaged element in a direction substantially normal to the latter at the point of engagement, said means causing successive intermittent engagements of each driving member with its said engaged element to shift around the latter variably according to the extent of said relative eccentricity.

55. Variable speed transmission means comprising in combination rotatable driving and driven elements, one of said elements having an effective movement-imposing portion adjustable relatively to the other element into positions of greater or less eccentricity, driving units distributed about the axes of said elements and operatively connected with one of said elements and having intermittent, circumferentially adjustable, rolling engagement with the other, and means to vary the eccentricity of said movement-imposing portion thereby to vary correspondingly the effective driving periods and also the relative spacing of said driving units.

56. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements, means to produce intermittent, circumferentially adjustable, rolling engagement of said unit and the other of said elements, and means to retain each driving unit in juxtaposition to the element which it engages during the periods between said intermittent rolling engagement.

57. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements, means to produce intermittent, circumferentially adjustable, rolling engagement of each unit and the other of said elements, and guide means to retain said driving unit in juxtaposition to the element which it engages during the periods between said intermittent rolling engagement and to direct the same from juxtaposition into intermittent rolling engagement.

58. Variable speed transmission means comprising in combination rotatable driving and driven elements, one of said elements having an effective movement-imposing portion adjustable relatively to the other element into positions of greater or less eccentricity, driving units distributed about the axes of said elements, each driving unit operatively connected with one of said elements, means to produce intermittent, circumferentially adjustable, rolling engagement of said units and the other of said elements, and positive means to retain said driving units in juxtaposition to the element which they engage during the period between said intermittent rolling engagement.

59. Variable speed transmission means comprising in combination rotatable driving and driven elements, one of said elements having an effective movement-imposing portion adjustable relatively to the other element into positions of greater or less eccentricity, driving units having effective segmental portions distributed about the axes of said elements, each such unit operatively connected with one of said elements and having circumferentially adjustable, rolling engagement with the other, and means to impart relative movement of approach into and recession from effective driving engagement of said driving units and engaged element.

60. Transmission mechanism for converting constant rotary into variable speed rotary motion, comprising in combination an operatively associated train of elements including a rotary member, an annular member surrounding the axis thereof, an adjustable group of driving units distributed about the axis of said annular member and operatively engaged with said rotary member, and means to produce relative change of position in an endless path between said annular member and said group of driving units to cause the latter progressively to make adjustable intermittent rolling engagement with and about said annular member thereby to produce rotation of one of the members with which they are engaged at a speed depending upon the adjustment of said driving units.

61. Transmission mechanism for converting constant rotary into variable speed rotary motion, comprising in combination an operatively associated train of elements including a rotary member, an annular member surrounding the axis thereof, a group of driving units distributed about the axis of said annular member and operatively engaged with said rotary member, and means to produce variable, relative change of position between said annular member and said driving units to cause the latter to make progressive adjustable intermittent rolling engagement with and about said annular member thereby to effect rotation of one of said members with which they are engaged at a speed depending upon the length and frequency of the periods of rolling engagement of said driving units and said annular member.

62. Transmission mechanism for converting constant rotary motion into variable speed rotary motion comprising in combination an operatively associated train of elements including rotatable driving and driven elements, one surrounding the other, adjustment-controlling means relatively to adjust the effective, movement-imposing positions of said elements, a circumferential series of driving units distributed about the axes of said elements and operatively connected with one thereof, an annular surface having an abutment formation, and means whereby rotation of the driving element causes each of said units intermittently to approach into and recede from effective driving engagement with said abutment formation with their thrust lines substantially normal thereto thereby to impart variable rotary motion from said driving to said driven element.

In testimony whereof I have signed my name to this specification in the presence of two subscribing witnesses.

BICKNELL HALL.

Witnesses:
EVERETT S. EMERY,
BESSIE J. SMITH.